(12) United States Patent
Vastmans et al.

(10) Patent No.: US 8,696,221 B2
(45) Date of Patent: Apr. 15, 2014

(54) METHOD FOR SPLICING AN OPTICAL FIBER ELEMENT

(75) Inventors: Kristof Vastmans, Boutersem (BE); Yan Kelecom, Boutersem (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 150 days.

(21) Appl. No.: 13/262,455

(22) PCT Filed: Apr. 1, 2010

(86) PCT No.: PCT/EP2010/002116
§ 371 (c)(1),
(2), (4) Date: Sep. 30, 2011

(87) PCT Pub. No.: WO2010/112235
PCT Pub. Date: Oct. 7, 2010

(65) Prior Publication Data
US 2012/0020630 A1    Jan. 26, 2012

(30) Foreign Application Priority Data
Apr. 3, 2009 (EP) ................................ 09005015

(51) Int. Cl.
*G02B 6/255* (2006.01)
(52) U.S. Cl.
USPC ........................................................ 385/99
(58) Field of Classification Search
USPC ........................................................ 385/99
See application file for complete search history.

(56) References Cited
U.S. PATENT DOCUMENTS
4,846,545 A    7/1989 Estabrook et al.

FOREIGN PATENT DOCUMENTS

DE    3637812 A1    5/1988
EP    0355923 A2    2/1990

OTHER PUBLICATIONS

International Preliminary Report on Patentability, issued by the International Bureau of WIPO, Geneva, Switzerland, dated Oct. 4, 2011 for International Application No. PCT/EP2010/002116; 8 pages.
International Search Report and Written Opinion issued by the European Patent Office, dated Jul. 1, 2010, for related International Application No. PCT/EP2010/002116; 13 pages.
European Search Report issued by the European Patent Office, dated Aug. 26, 2009, for Priority Application No. EP09005015; 7 pages.

*Primary Examiner* — Jerry Rahll
(74) *Attorney, Agent, or Firm* — Faegre Baker Daniels LLP

(57) ABSTRACT

The present invention relates to a method for splicing an optical fiber element (13, 23) of an optical cable (1, 2) reinforced with at least one strain relief fiber element (14, 24) and a splice effected by such method. In order to improve the strain resistance of the spliced optical cables (1, 2), the method according to the invention comprises the steps removing a jacket (11, 21) thereby exposing the optical fiber elements (13, 23) and the at least one strain relief fiber element (14, 24) of each of the two optical cables (1, 2) to be spliced, joining the optical fiber elements (13, 23) of the two optical cables (1, 2) to be spliced, providing a splicing sleeve (40) in such a way that it surrounds the joint of the two optical fiber elements (13, 23), attaching said splicing sleeve (40) against the circumferential surface of said optical cables (1, 2) thereby connecting the exposed strain relief fiber elements (14, 24) of the two optical cables (1, 2) to each other. The present invention furthermore provides a splice of two optical cables having improved strain resist which is characterized in that the strain relief fiber elements are connected to each other with the exposed optical fiber elements (13, 23) being surrounded by the sleeve.

18 Claims, 3 Drawing Sheets

METHOD FOR SPLICING AN OPTICAL FIBER ELEMENT

The patent invention relates to a method for splicing an optical fiber element of an optical cable reinforced with at least one strain relief fiber element.

When splicing an optical cable, the ends of the cables to be spliced are prepared by exposing the optical fiber element to be spliced. For this, a jacket surrounding the optical fiber element is cut in longitudinal direction thereby making the at least one optical fiber element accessible in radial direction. The respective optical fiber element can be pulled out from the optical cable. In particular, if fairly small diameter optical cable with only a few or even one optical fiber element surrounded by the jacket is to be spliced, the jacket is completely removed at the free end of the optical fiber to be spliced thereby exposing the at least one optical fiber element. For appropriate splicing, the two optical fiber elements to be spliced have to have a certain free length which is needed for proper alignment and fixing of the optical fiber elements to be spliced during splicing operation. In particular, in case of a fusion splice, i.e. in the case where the two optical fiber elements are joined by fusion, not only the jacket but also a coating surrounding the optical fiber element has to be removed for a certain length. Before effecting fusion splicing, the stripped optical fiber element may need cleaning and/or cleaving of the optical fiber end. As a consequence, the joint, i.e. the connection of the two optical fiber elements to be spliced, is essentially arranged in the middle of a jacket-free splicing area arranged within opposing end faces of the remaining jacket of the two optical cables.

For this reason, the splice and the exposed optical cable need additional protection. Such additional protection may be provided by a mechanical splice protector which receives the end sections of the two optical fiber elements to spliced and aligns those end sections such that optical signals can be transferred at the splice essentially without optical losses. If for example the splice is effected by fusion of the two optical fiber elements to be spliced, such splice is surrounded by a sleeve which fully covers the jacket-free splicing area and extends over the circumferential surface of the jacket of each of the two optical cables at least at an end section of said jackets. Accordingly, the sleeve can be considered as a substitute to the jacket material removed for splicing. The splicing sleeve usually comprises a rigid strength member which is to provide a certain bending strength in the jacket-free splicing area. Thus, the splicing sleeve provides additional rigidity of the optical cable after splicing in the jacket-free splicing area. The splicing sleeve can be fully closed in circumferential direction. In this case, the splicing sleeve is usually slided over the jacket of one of said optical cables before splicing and slided over the jacket-free splicing area after splicing for attaching the splicing sleeve against the circumferential surface of the jacket of both optical cables adjacent to the jacket-free splicing area. A splicing sleeve may likewise have a longitudinal recess which allows a certain degree of radial bending of the splicing sleeve and/or mounting of the splicing sleeve by attaching the sleeve after splicing.

While the known method to protect the jacket-free splicing area with the splicing sleeve provides sufficient protection to avoid an inadmissible degree of bending within the splicing area which may lead to optical losses, the known protection of the jacket-free splicing area by means of a splicing sleeve is still insufficient for transmitting an axial pulling force. Such pulling force of more than 20N may be necessary to pull e.g. a smaller diameter optical cable of less or equal than 900 μm through duct for cable work in a building. Such small diameter optical cable may e.g. be used to provide an excess point for an optical fiber network in a single dwelling unit of a multi-dwelling building complex. Such small diameter optical cable may have strain relief fiber elements generally in form of a Kevlar fiber element contained within the jacket. Those strain relief elements, however, are cut in the jacket-free splicing area. Accordingly, their strain relief effect is lost. Accordingly, the splice and the area around the splice is rather weak and likely to fail if elevated pulling forces of more than 20N are applied to the optical cable to pull the same through ductwork for cable within a building.

In prior art, splicing of an optical fiber element of optical cables reinforced with strain relief fiber elements is conducted by joining the optical fiber elements of the two optical cables to be spliced. After that, a splicing sleeve is provided to cover the splice between the two optical fiber elements. Then, the strain relief fiber elements are arranged above the splicing sleeve and connected to each other. Finally, the free ends of the strain relief fiber elements are covered by a protective sleeve. Such method is e.g. known from U.S. Pat. No. 4,846,545. In this prior art, a splicing sleeve is provided around the exposed and spliced optical fiber elements. A further protective sleeve is provided around the splicing sleeve. Finally, a heat shrinkable sheath is provided encompassing the jacket of the two optical fiber elements and bridging the entire range of removed jacket and the protective sleeve surrounding the splicing sleeve. Thus, the method for splicing known from this prior art document is complicated and, hence, troublesome and expensive.

According to a further prior art document EP 0 355 923 A2, the optical fiber elements of the two optical cables are spliced and protected by splicing sleeve. The splicing sleeve is surrounded by a hot melt adhesive, which is made to melt when shrinking a heat shrinkable tube against the jacket of the two optical cables, which heat shrinkable sleeve bridges the splicing sleeve.

Another method to splice an optical fiber element of an optical cable reinforced with at least one strain relief fiber element is known from DE 36 37 812 A1. The joint between the optical fiber elements is surrounded by a rigid splicing sleeve or at least one shell element, which is stiff to reduce a bendability of the optical fiber elements spliced in the jacket-free area. After that, the strain relief elements are arranged around the rigid sleeve and the strain element of the two different optical cables are connected with each other.

The present invention aims to provide a method for splicing an optical fiber element of an optical cable comprising at least one strain relief fiber element, which method provides a splice having improved strain and can be formed easily and economically. Further, the present invention aims to provide a splice of two optical cables with at least one strain relief fiber element having improved strain.

As a solution to the above object, the present invention provides a method as defined in claim 1.

In said method, the jackets of the two optical cables are removed as generally known in prior art, thereby exposing the optical fiber element and the strain relief fiber element of the two optical cables to be spliced. In the inventive method, it may be sufficient to use only one strain relief fiber element of each of the two optical cables to be spliced in order to improve strain of the spliced optical cable. However, the higher the number of strain relief fiber elements, the better the strain. Accordingly, it is preferred to expose multiple strain relief fiber elements of both optical fibers before splicing. For high strain requirements, the use of optical cables having more than one strain relief fiber element and exposing and thereby using the strain relief fiber elements as elements to improve the strain at the splice will be advantageous.

According to the inventive method, the optical fiber elements of the two optical cables to be spliced are joined. Joining may be attained by any known method, preferably by fusion splicing.

After this, a splicing sleeve is provided over the joint, e.g. by sliding the sleeve from the jacket of said one optical cable towards the other of said optical cables. The respective splicing sleeve may have been provided before splicing, which is considered to be necessary when using a circumferentially closed splicing sleeve. In case of a splicing sleeve having a longitudinal slot, the same may likewise be provided after joining the optical fiber elements. This sliding movement is preferably stopped if the splicing sleeve bridges the splicing area. After this, the joint of the optical fiber elements of the two optical cables and the strain relief fiber elements are exposed within the splicing sleeve and surrounded by the same. In other words, the splice of the optical fiber elements is retained within the splicing sleeve and exposed therein. In this position, the splicing sleeve is attached against the circumferential surface of the optical cables, i.e. the remaining jacket adjacent to the exposed optical fiber elements, thereby sealing the splicing area against the environment. When sealing the splicing area with the splicing sleeve, the strain relief fiber elements of the two optical cables are connected to each other. Thus, the strain enforcement effected by the strain relief fiber elements of both optical fibers is made to bridge the splicing area and thus transmit any pulling force over the splicing area.

When attaching the splicing sleeve, the same is usually moved against the optical cables to be spliced in radial direction thereof. In the course of such radial movement of the splicing sleeve, the strain relief fiber elements and the splice joint between the optical fiber elements of the two cables become tightly surrounded by the splicing sleeve. Preferably, a rigid bridging element like e.g. a cylinder rod is surrounded by the splicing sleeve before attaching the same to the two optical cables to be spliced. Thus, when attaching the splicing sleeve against the circumferential surface of the optical cables, the bridging element is pressed against the cables in radial direction, specifically pressed and preferably intimately connected to the exposed optical fiber element. When attaching the splicing sleeve, the same is preferably urged, i.e. biased in radial direction directly or indirectly with strain relief and/or bridging elements inter disposed against the exposed optical fiber elements of both cables and/or against the optical cables.

In the inventive method, the strain relief fiber elements can be connected to each other by directly fixing against each other. For this, those strain relief fiber elements of the two optical cables to be spliced are exposed such that they overlap each other.

Alternatively or additionally, the exposed strain relief fiber elements can be connected to each other with a bridging element in between. For this, the exposed strain relief fiber elements of the two optical cables are arranged to overlap the bridging element of the splicing sleeve such that the exposed strain relief fiber elements are fused against each other indirectly by means of the bridging element. Naturally, the strain relief fiber elements of the two optical cables to be spliced may preferably be adapted to overlap each other and the bridging element.

The bridging element can be any element, which is suitable to transmit a pulling force exerted in axial direction of the optical cable. This bridging element may be formed by the rigid strength member mentioned in the introductionary part of this application which may form part of a shrink sleeve. The bridging element is preferably a rigid bridging element, e.g. a metal wire or cylinder. It may likewise be formed of a rather stiff polymeric material in form of a wire or tube. The bridging element serves usually two purposes. It is to improve bending strength within the splice area to avoid excessive bending. Further, the bridging element should transmit a tensile force over the splicing area. The bridging element may be specifically adapted to provide a surface promoting fixing of the strain relief fiber elements. The strain relief fiber elements are preferably fixed against each other and against the bridging element by means of a solidified hot melt. For enforcing the fixing of the strain relief fiber elements against the bridging element, the same should have a surface adapted to provide optimum adhesion to the melt used. Such adaption may for example be provided by a rough outer surface of the bridging element. Thus, in the inventive method, the bridging element is—by means of a radial inward force of the splicing sleeve connected to the exposed strain relief fiber elements and/or the exposed optical fiber elements. Thus, the connection between the exposed optical fiber elements may be improved by the bridging element. An appropriate way to secure the bridging element against the optical fiber elements and/or the strain relief fiber elements is preferably to provide an adhesive therebetween surrounded by the splicing sleeve. The adhesive can e.g. be a polymeric material, which melts upon the application of heat (hot melt). A respective adhesive may be formed on the inner circumferential surface of the splicing sleeve, which splicing sleeve is preferably a sleeve exhibiting a radial inward move upon activation. Activation can e.g. be obtained by applying heat to the splicing sleeve. The splicing sleeve may likewise be an elastic sleeve, which is expanded in radial outward direction with elastic deformation being secured prior to releasing by e.g. a mechanical support structure, which support structure can be released for activation of the splicing sleeve.

The adhesive may be injected after sliding the splicing sleeve over the joint of the two optical fiber elements. However, according to a preferred embodiment of the present invention, the splicing sleeve itself is provided with the adhesive, which is preferably rendered liquidly in case of heating the splicing sleeve. Thus, in a preferred embodiment, the splicing sleeve is slid over the joint of the two optical fiber elements to directly cover the splice between the optical fiber elements. In this preferred embodiment, the splice between the optical fiber elements is not surrounded by an additional splicing sleeve, which may be surrounded by the strain relief fiber elements. In fact, in the respective preferred embodiment after the splicing sleeve has been slid over the joint between the optical fiber elements, a respective splicing sleeve or, preferably, the at least one bridging element and/or strain relief elements are the only neighboring elements to the splice in radial direction of the optical cables.

In yet another preferred embodiment of the present invention, the strain relief fiber element of at least one of the optical cables is provided with a length projecting the joint between the optical fiber elements. In other words, the strain relief fiber element is prepared when cutting the at least one optical cable with a length greater than the optical fiber element of the same optical cable. After joining of the optical fiber elements of the two optical cables, the respective strain relief fiber element will be adapted to pass the joint and extend over a certain length of a bridging element and/or a strain relief element of the other optical cable, thereby providing considerable overlap which improves transmission of a tensile force over the splice. In this preferred embodiment, the strain relief elements are preferably urged against the circumferential surface of the opposed optical cable and, hence, fixed against the outer circumference thereof to enforce the optical joint between the exposed optical fiber elements. More preferably, at least one strain relief element of one of the optical cables is preferably cut to a length suitable to pass the respective strain relief fiber element over the splice between the optical fiber elements until the circumferential surface of the opposed optical fibre cable is reached. Thus, the strain relief element is adapted to cooperate with the other optical cable. Accordingly, a strain relief connection is adapted to be formed bridging the optical splice and, hence, a tensile force acting on the spliced optical cable may act as a compression force in the optical splice. Such effect can specifically be attained in the event a connection is made between the strain relief fiber elements of one optical cable to the circumferential surface of the other optical cable, while connecting strain relief fiber elements of the other optical cable to the circumferential surface of said one optical cable, while providing no direct connection between the strain relief fiber elements and the optical fiber elements in the region of the optical splice. Respective connection may e.g. be attained by an adhesive, which is specifically provided in a selected area in axial direction of the sleeve on the inner circumference of the splicing sleeve.

Fixing of the at least one strain relief fiber element may be attained by a force fit and/or a form fit and/or a material-bonded-connection between the strain relief fiber elements of the two optical cables and/or any bridging element provided.

Preferably, the splicing sleeve is attached against the circumferential surface of the optical cables by shrinking, preferably by heat shrinking. In view of this, the splicing sleeve comprises a shrink tube which forms an outer circumferential surface of the splicing sleeve. In order to improve fixing of the strain relief fiber elements, an adhesive, e.g. a hot melt, which is contained within the splicing sleeve, is squeezed between the shrink tube and the circumferential surface of the optical cable during shrinking of the tube. Usually, the tube will have a longer axial extension than the adhesive provided within the splicing sleeve.

In case of heat shrinking, the adhesive in form of a hot melt will be heated and thereby be made liquid. Usually, the hot melt provided within the shrink tube is infrared-heated. For those reasons, the hot melt melts first and before the shrink tube is thermally initiated to shrink. Usually, the splicing sleeve has ends with no hot melt. In absence of any hot melt being infrared-heated, those ends will be initiated to shrink at last. Accordingly, shrinking of the shrink tube would first compress the hot melt in the central part of the splicing area and it is believed that the shrinking tube gradually shrinks from the middle of this splicing area to the opposing free ends thereby pressing remaining air out of the splicing area. After the shrink tube has circumferentially and tidily sealed the hot melt, the same will likewise seal against the outer circumference of the remaining jacket adjacent to the splicing area. The adhesive may likewise be a curing adhesive, which bonds to the exposed optical fiber elements and/or the strain relief fiber elements as well as—if present—to the bridging elements, which adhesive being forced against the outer circumference of the optical fiber elements and/or the strain relief elements upon shrinking of the splicing sleeve.

Preferably, the splicing sleeve is slid over the jacket of the other optical cable, thereby arranging the strain relief fiber element of said one optical cable essentially on the circumferential surface of the other optical cable. Then, the splicing sleeve is slid in opposite direction and arranged in such a way that the splicing sleeve overlaps the jacket of each of the two optical cables adjacent to the exposed optical fiber elements of said optical cables. With this arrangement, the splicing sleeve bridges the jacket-free splicing area and extends over a certain length of the remaining jacket of both optical cables. Since the strain relief fiber element of said one optical cable is as a result of the first sliding movement of the splicing sleeve arranged essentially on the circumferential surface of said other optical cable, the strain relief fiber element will be arranged between the inner circumferential surface of the splicing sleeve and the outer circumferential surface of the jacket of said other optical cables. As a consequence of the respective sliding operation of the splicing sleeve the strain relief fiber elements of the two optical cables are arranged in a predetermined way facilitating proper connection of the strain relief fiber elements with each other.

According to a further preferred embodiment, the step of sliding the splicing sleeve over the jacket of said other optical cable includes bending of an exposed strain relief fiber element of said other optical cable, thereby arranging said strain relief fiber element between the splicing sleeve and the circumferential surface of said other optical cable. The sliding operation of the splicing sleeve in the first sliding direction over the jacket is stopped after said splicing sleeve has passed the free end of said exposed strain relief fiber element of said other optical cable. After sliding in this first direction, a revised sliding operation of the splicing sleeve is initiated leading to arrangement of said at least one strain relief fiber element of said other optical cable within the jacket-free splicing area. In particular, by using a hot melt which is allowed to flow within the jacket-free splicing area upon heat treatment, the strain relief fiber elements of the two optical cables may be joined by the hot melt, thereby improving the strain of the spliced optical cable.

According to a preferred embodiment, the optical fiber element of one of said optical cables is cut to a length shorter than the length of the exposed strain relief fiber element of said one optical cable. Accordingly, when sliding the slicing sleeve in the first sliding direction and over the jacket of said other optical cable, the strain relief fiber element of said one optical cable is arranged over the circumference of the jacket of said other optical cable. The above-described reversed sliding operation is commenced before the sliding sleeve has passed the free ends of the longer strain relief fiber elements of said one optical fiber cable. With this method, a certain degree of overlap between the longer strain relief element of said one optical cable and the strain relief of the other optical cable having a length at least not longer than the optical fiber element of said other optical cable is achieved.

In a further preferred embodiment, the excess length of the strain relief fiber element of said one optical cable projecting the splicing sleeve after arrangement of the same overlapping the jackets of both optical cables is cut. Cutting preferably is conducted in such a way, that the excess length is completely removed. As a result, the strain relief fiber element terminates essentially at the end of the splicing sleeve. Cutting of the excess length of the strain fiber element will reduce the resistance of the spliced optical cable when pulling the same through ductwork of a building.

The present invention furthermore provides a splice of two optical cables which have been formed according to the above described method. The inventive splice is defined in claim 13 and comprises two cables, each of them having at least one optical fiber element. Further, there is provided at least one strain relief fiber element. Preferably, the strain relief fiber element of the two optical cables is provided within the splice. Further, the splice comprises a splicing sleeve surrounding the optical fiber elements of the two optical cables and at least one exposed strain relief fiber element of each optical cable.

The two optical fiber elements to be spliced and the at least one strain relief fiber elements of both optical cables to be spliced are exposed by removal of the jacket of the respective optical cables. The at least one strain relief fiber elements of the two optical cables are connected to each other, thereby effecting a strain relief from one optical cable to the other, essentially bypassing the splice between the spliced optical fiber elements of the two optical cables. In the inventive splice, the strain relief fiber elements of the two optical cables can be directly connected with each other or by means of the aforementioned bridging element with the exposed optical fiber element being exclusively surrounded by the splicing sleeve, preferably with the strain relief fiber elements inter disposed between the exposed optical fiber elements and the splicing sleeve, and—if present—with the bridging element being arranged inter disposed between the splicing sleeve and the optical fiber elements.

In a preferred embodiment, the end of the strain relief fiber element of at least one of said optical cables is arranged within the splicing sleeve. Further preferable, the end of the strain relief fiber element of said at least one optical cable is arranged between the circumferential surface of said one optical cable and the inner circumferential surface of the splicing sleeve. Alternatively, the strain relief fiber element of said one optical cable is preferably fixed between the circumferential surface of said other optical cable and the inner circumferential surface of said splicing sleeve. In both cases, the strain relief elements usually contact the circumferential surface of an optical cable and are connected thereto.

Further embodiments of the inventive splice are set out in the dependent claims 14 to 16.

The present invention will be described hereinafter in greater detail and in an exemplary manner by referring to an embodiment depicted schematically in the drawings. In the drawings.

Figure 1A:
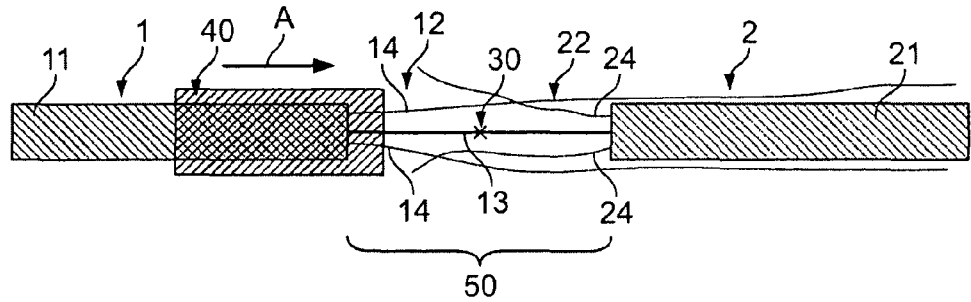
FIG. 1a is a schematic sight of a first step in the splicing method.
Figure 1B:
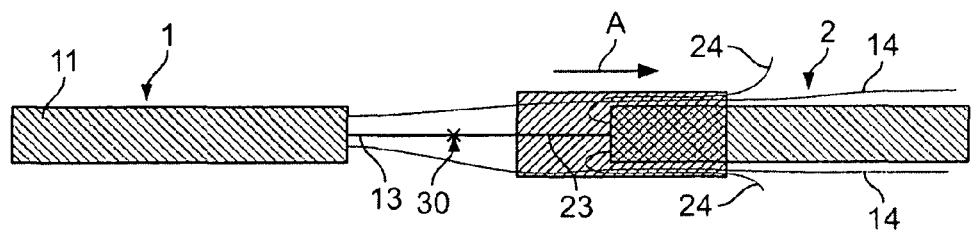
FIG. 1b is a second step in the splicing method.

All FIGS. 1a to 1e show a schematic side view of two optical cables 1, 2 to be spliced. Each of said cables 1, 2 have a jacket 11, 12 which is removed at the forward end 12, 22 of the respective optical cables 1, 2, thereby exposing an optical fiber element 13, 23 and two strain relief fiber elements 14, 24 of each of said optical cables 1, 2. In the shown embodiment, the two optical cables 1, 2 are optical cables Tyco Electronics Pico-Breakout Cable with optical fiber elements of 250 μm, a thight acrilate reinforcement with an outer diameter of 350 μm around said optical fiber element and a polyamide sheath with an outer diameter of 750 μm forming the jacket of the cable. Between the polyamide sheath and the acrilate, there is arranged a strength member of aramidic yarns, each of said yarns forming a strain relief fiber element in the meaning of the present invention. FIG. 1a shows a situation, in which a splice 30 has already been effected by standard fusion splicing. Prior to splicing, a splicing sleeve 40 had been provided on the jacket 11 of the optical cable 1 in such a way, that a jacket-free splicing area 50 is provided between opposing ends of the two jackets 11, 21.

After standard fusion splicing, this splicing sleeve 40 is shifted from the one optical cable 1 to the other optical cable 2 in the direction of arrow A until the splicing sleeve 40 is shifted over the jacket 21 of the other optical cable 2. In this shifting operation, the two strain relief fiber elements 14 of the one optical cable 1 are arranged essentially in parallel with the outer circumferential surface of the jacket 21 of the other optical cable 2. Further, the strain relief fiber elements 24 of the other optical cable 2 are likewise arranged between the inner circumferential surface of the splicing sleeve 40 and the outer circumferential surface of the jacket 21 (see FIG. 1b).

When comparing the length of the strain relief fiber elements 14, 24, it is immediately evident that the strain relief fiber elements 14 are much longer than the length of the optical fiber element 13 projecting the jacket 11. In other words, the jacket 11 of the one optical cable 1 is removed to a greater length than the jacket 21 of the other optical cable 2. After that and prior to splicing, the optical element 13 of the one optical cable 1 had been cut to a length considerably shorter than the length of the strain relief fiber elements 14 of said cable 1. The length of the optical fiber element 23 corresponds essentially to the length of the respective strain relief fiber element 24 of the other optical cable 2. The optical fiber element 23 is in fact a bit shorter due to the preparation of the optical fiber element 23 required for appropriate splicing which involves the provision of a clean cutting surface at the end of both optical fiber elements 13, 23.

Figure 1C:
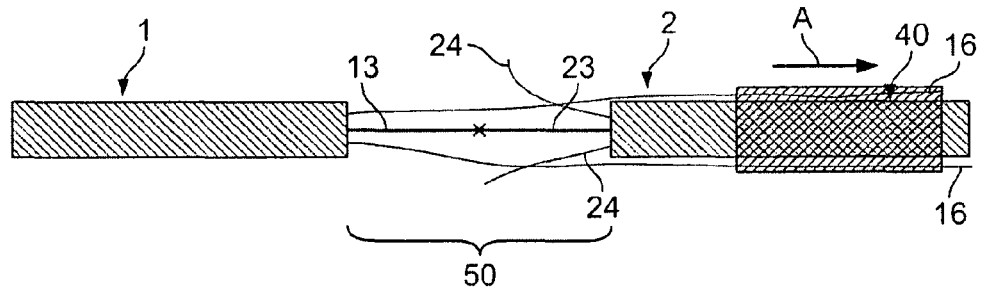
FIG. 1c is a third step in the splicing method.
Figure 1D:
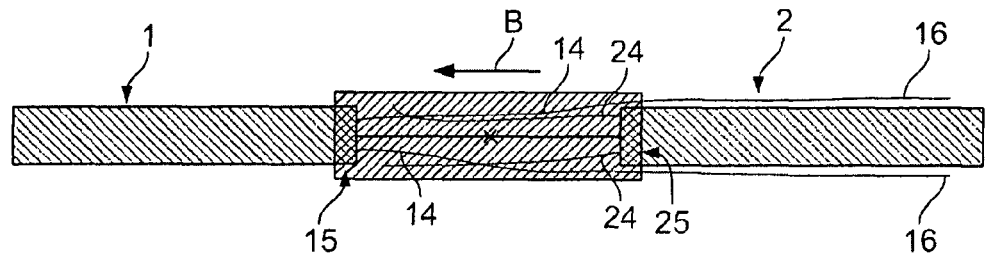
FIG. 1d is a fourth step in the splicing method.

Due to the above described length differences, the strain relief fiber elements 24 of the other optical cable 2 are released from the splicing sleeve 40 at FIG. 1c while the strain relief fiber elements 14 of the one optical cable 1 are still received within the splicing sleeve 40 and arranged essentially on the circumferential surface of the other optical cable 2, namely the jacket 21 of said optical cable 2.

The sliding movement of the splicing sleeve 40 is stopped before free ends 16 of the strain relief fiber elements 14 pass the forward end of the splicing sleeve 40 in sliding direction A. Thereafter, the free ends 16 of the strain relief fiber elements 14 may be temporarily fixed against the circumferential surface of the jacket 21. After this, the sliding movement of the splicing sleeve 40 is reverted arrow B until the position depicted in FIG. 1d has been reached. In this position, the splicing sleeve 40 fully surrounds the jacket-free splicing area 50 between the opposing jackets 11, 21 and surrounds an end section 15, 25 of both jackets 11, 21. The length of the end sections 15, 25 surrounded by said splicing sleeve 40 is essentially identical. In the position according to FIG. 1d, the splicing sleeve is attached against the circumferential surface of the optical cables 1, 2, i.e. against the outer circumference of the jackets 11, 21. This is preferably attained by heating the splicing sleeve 40 comprising a shrink tube to appropriate temperature to affect heat shrinking of the shrink tube. As a result, the strain relief fiber element 14 of the one optical cable 1 is fixed to the outer surface of the jacket 21 such that a pulling force transmitted by the spliced optical cable 1, 2 is predominantly, if not exclusively transmitted by the strain relief fiber elements 14.

Figure 1E:
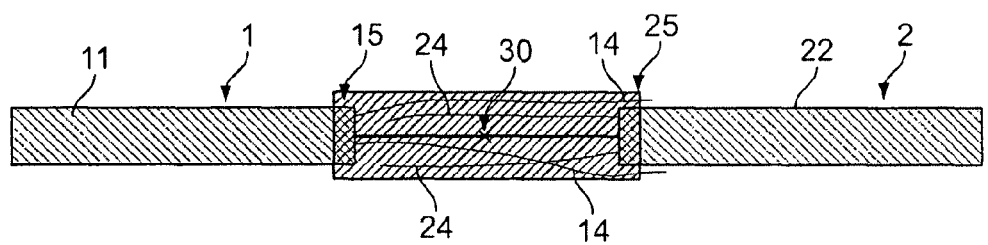
FIG. 1e is a last step in the described embodiment of method for splicing.

FIG. 1e shows the last step for effecting splicing in the above described way by cutting the free end 16 of the strain relief fiber element 14 projecting the splicing sleeve 40.

In both of the examples, when shrinking the splicing sleeve 40, the strain relief fiber element 14 is connected to the optical cable 2 by forcing the same in radial inward direction and against the outer circumference of the jacket 21. Thus, an enforcement of the exposed optical fiber elements 13, 23 by connection between the strain relief fiber element 14 and the opposed optical cable 2 is achieved.

Figure 2:
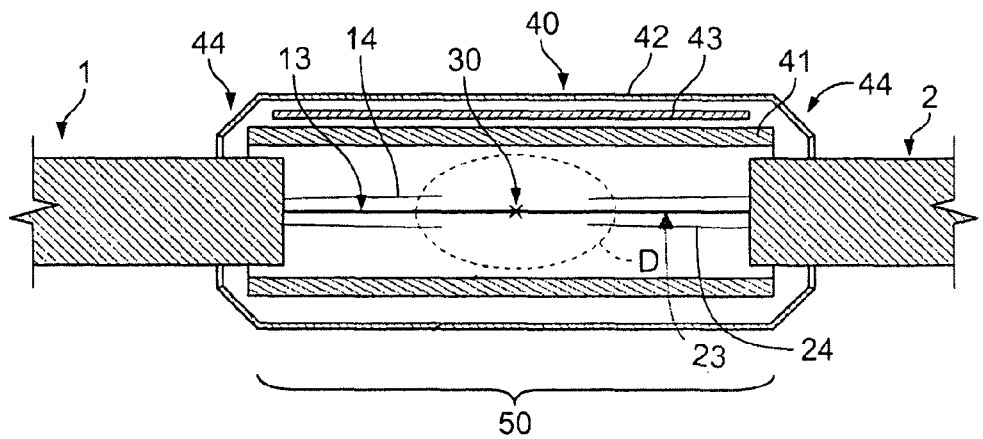
FIG. 2 is a schematic cross-sectional view of the situation depicted in FIG. 1e for an alternative embodiment.

FIG. 2 shows an alternative embodiment of the situation depicted in FIG. 1*e* and described above. In particular, FIG. 2 elucidates the details of the splicing sleeve 40 being composed of an inner tube of the hot melt 41, which is surrounded by a shrink tube 42 of heat shrinkable polymer sheet receiving there between a metallic cylinder rod 43 which constitutes a specific embodiment of the bridging element of the present invention. This cylinder rod 43 is arranged between the outer circumference of the cylinder of hot melt 41 and the inner circumferential surface of the shrink tube 42.

As evident from FIG. 2, each of the optical cables 1, 2 have strain relief fiber elements 14, 24 being cut to a length shorter than that of the optical fiber elements 13, 23 of the respective optical cables 1, 2. When securing the splicing sleeve 40 to the splice, an infrared heating is applied to the hot melt 41. Due to this, the cylindrical tube of hot melt 41 becomes liquid and collapses into the jacket-free splicing area 50. This collapse is assisted by the thermally induced shrinking of the shrink tube 42. As evident from FIG. 2, the shrink tube 42 has end sections 44 axially projecting the hot melt tube 41. Due to this, the central area above the splice 30 will be started to contract in radial direction before the end sections 44 start to shrink. On a general basis, it is believed that the central section of the shrink tube 42 shrinks first and thus forces the hot melt 41 against the optical fiber elements 13, 23 and the strain relief fiber element 14 of optical cable 1 and those strain relief fiber element 24 of the optical cable 2. The cylinder rod 43 may likewise have a length which is adapted to fit within the jacket-free splicing area 50. Accordingly, the respective cylinder rod 43 will be received within the free ends of the jackets 11, 21 of the respective optical cables 1, 2. Alternatively, the cylinder rod 43 may have a length adapted to lay against the outer circumferential surface of the jackets 11, 21 of respective optical cables 1, 2. Due to the heating of the hot melt 41 the end sections 44 are the last to obtain a temperature sufficient to initiate shrinking. The selection of dimensions should be such that those end sections 44 shrink after the shrink tube 42 has radially compressed the entire melted hot melt 41 within the jacket-free splicing area 50. Shrinking against the outer circumference of the jackets 11, 21, this jacket-free splicing area 50 is finally sealed against environment by the shrink tube 42.

Figure 3:
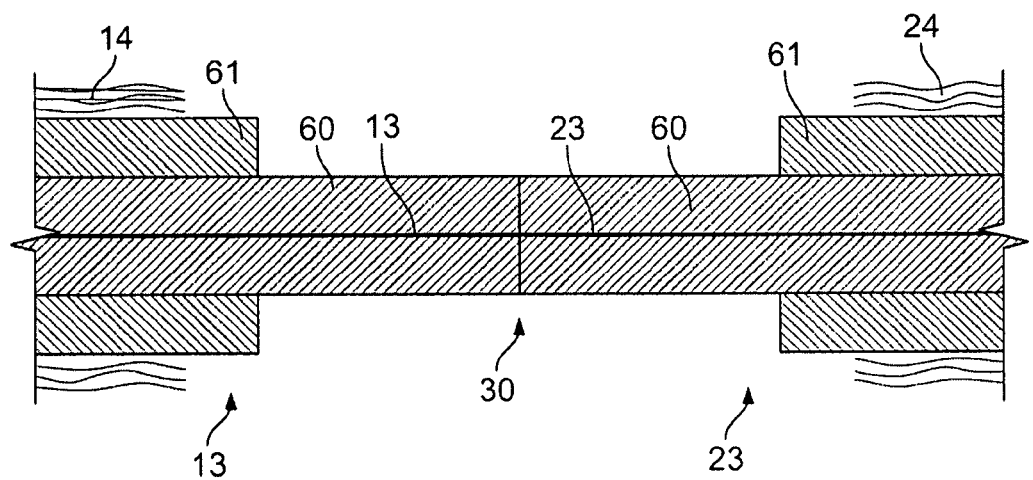
FIG. 3 is the detail D according to FIG. 2 in an enlarged view.

FIG. 3 elucidates various layers around the optical fiber elements 13, 23 of the two optical cables 1, 2. Those optical fiber elements 13, 23 may have a diameter of between 9 to 10 µm and are usually surrounded by a cladding 60. Around said cladding there is provided a coating 61 which usually is removed to a certain length to allow fusion splicing. When removing the coating 61, the strain relief fiber element 14, 24 is likewise removed with respective length. In other words, the strain relief fiber elements 14, 24 of each optical cable 1, 2 are surrounding the coating 61.

Figure 4:
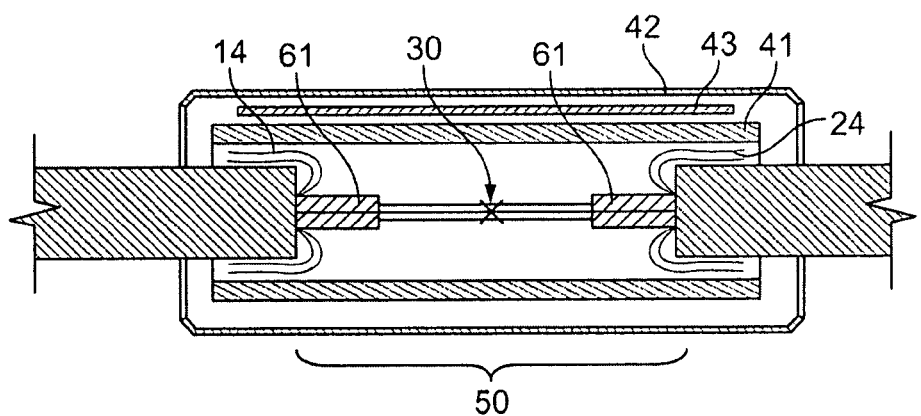
FIG. 4 is a cross-sectional view of the situation depicted in FIGS. 1e and 2 of a third embodiment of the present invention.

FIG. 4 shows a third embodiment of the present invention in which the cables 1, 2 to be spliced have been prepared by removing the jacket 11, 21, thereby exposing the strain relief fiber elements 14, 24 and the optical fiber elements 13, 23. In the embodiment of FIG. 4, all strain relief fiber elements 14 of the one optical cable 1 have been bent outwardly to lie on the outer circumference of the jacket 11 of said optical cable 1. A respective arrangement is achieved for the strain relief elements 24 of the other optical cable 2. The splicing sleeve 40 have a length exceeding the axial extension of the jacket-free splicing area 50. The length of the cylinder rod 43 is selected essentially in accordance with the length of both strain relief fiber elements 14, 24 lying on the circumference of the jacket.

Upon infrared heating, the hot melt 41 becomes liquid and fills the jacket-free splicing area 50, thereby encapsulating the optical fiber elements 13, 23 of both optical cables 1, 2 as well as the strain relief fiber elements 14, 24 and the coating 61 of both of the optical cables 1, 2. Further, the entire axial length of the exposed optical fiber elements 13, 23 is reinforced by the bridging element 43, which is secured against the strain relief fiber elements 14, 24 and/or the outer circumference of the optical cables 1, 2. The bridging element 43 can be cut to a length, which fits between the distance of the removed jacket 11, 21 of both optical cables 1, 2 to reinforce only the exposed optical fiber elements 13, 23 of both cables 1, 2. For this case, the bridging element 43 is secured against the exposed optical fiber elements 13, 23. In addition to such fairly short bridging element, there can be provided at least one other bridging element, which cooperates with the strain relief fiber elements 14, 24 and/or the outer circumference of the jacket 11, 21 of the two cables 1, 2. Further, the bent sections of the strain relief fiber elements 14, 24 within the jacket-free splicing area 50 are likewise encapsulated by the liquid hot melt. The tube providing the hot melt 41 has a dimension essentially appropriate to fill the entire jacket-free splicing area 50 with hot melt. Further, hot melt will surround the end sections of both jackets 11, 21 which are surrounded by the free end of the strain relief fiber elements 14, 24. Due to the radial compression force of the shrink tube 42, the cylinder rod 43 is compressed against the outer circumference of both jackets 11, 21, thereby connecting the free end of the strain relief fiber elements 14, 24 to the cylinder rod 43 and sealing the exposed strain relief fiber elements 14, 24 within the jacket-free splicing area 50 with hot melt which solidifies after heat shrinking the shrink tube 42. As a consequence, a pulling force on the two optical cables 1, 2 is transmitted from the free ends of the strain relief fiber elements 14, 24 to the rigid cylinder rod 43, which bypasses the splice 30 and the jacket-free splicing area 50 for transmittal of said pulling force.

The present invention is not restricted to the embodiments. In particular, multiple strain relief fiber elements of one optical cable may be arranged partially in a way as described, e.g. with respect to FIG. 2 and partially as described in combination with FIG. 3 and/or 1. In particular, part of the strain relief elements of both optical cables may be directly connected to each other and overlap each other, while others are connected to each other by the rigid bridging element. Further, different strain relief fiber elements of one optical cable may be cut to different lengths, such that the overlapping length with the strain relief fiber elements of the other optical cable varies for selected strain relief fiber elements and/or no overlap exists and the tensile force of selected strain relief fiber elements is transmitted only over the cylinder rod. As shown in FIG. 2, the strain relief elements of both optical cables 1, 2 may be exclusively arranged between the jackets 11, 21 of each of said optical cables 1, 2 and the splicing sleeve 40. In case the cylinder rod 43 is forced into the jacket-free splicing are 40 when shrinking the splicing sleeve 40 starting from a position in FIG. 2, the cylinder rod 43 will eventually be arranged such that the strain relief fiber elements 14, 24 are arranged adjacent to the cylinder rod 43. Thus, the cylinder rod 43 is arranged between the shrink tube 42 and the strain relief fiber elements 14, 24. Shrinking the shrink tube 42 of the splicing sleeve 40 from a position depicted in FIG. 4 results in arrangement of the strain relief fiber elements 14 of the optical cable 1 between the jacket 11 of said optical cable 1 and the cylinder rod 43. A respective arrangement will be attained for the strain relief fiber elements 24 of the other optical cable 2.

REFERENCE LIST

1 optical cable
11 jacket of optical cable 1
12 forward end of optical cable 1
13 optical fiber element of optical cable 1
14 strain relief fiber element of optical cable 1
15 end section of the jacket 11 of the one optical cable 1
16 free end of the strain relief fiber element 14
2 other optical cable
21 jacket of the other optical cable 2
22 forward end of the other optical cable 2
23 optical fiber element of the other optical cable 2
24 strain relief fiber element of the other optical cable 2
25 end section of the jacket 21 of the other optical cable 2
30 splice
40 splicing sleeve
41 hot melt
42 shrink tube
43 cylinder rod
44 end section
50 jacket-free splicing area
60 cladding
61 coating

The invention claimed is:

1. A method for splicing an optical fiber element of an optical cable reinforced with at least one strain relief fiber element comprising the steps of:
removing a jacket thereby exposing the optical fiber elements and the at least one strain relief fiber element of each of the two optical cables to be spliced;
joining the optical fiber elements of the two optical cables to be spliced;
providing a splicing sleeve in such a way that it surrounds the joint of the two optical fiber elements; and
attaching said splicing sleeve against the circumferential surface of said optical cables thereby connecting the exposed strain relief fiber elements of the two optical cables to each other, the exposed strain relief fiber elements and the exposed optical fiber elements being adjacent a portion of an inner surface of said splicing sleeve.

2. The method of claim 1, wherein the splicing sleeve is slid over a splice between the two optical fiber elements and urged to be biased against the two optical fiber elements and/or the optical cables.

3. The method of claim 1, wherein the exposed strain relief fiber elements are arranged to overlap each other, and that the strain relief fiber elements of one optical cable is fixed against the circumferential surface of the other optical cable.

4. The method of claim 1, wherein the exposed strain relief fiber elements are arranged to overlap a bridging element of said splicing sleeve and that said exposed strain relief fiber elements are connected to each other by means of said bridging element.

5. The method of claim 1, wherein said splicing sleeve is attached against the circumferential surface of said optical cables by shrinking.

6. The method of claim 5, wherein during heat shrinking a hot melt is squeezed between the optical fiber elements and the splicing sleeve thereby connecting the exposed strain relief fiber elements with each other and/or with the bridging element.

7. The method of claim 1, further comprising the step of introducing an adhesive between the optical fiber elements and the splicing sleeve, which adhesive bonds the exposed optical fiber elements and the exposed strain relief fiber elements.

8. The method of claim 1, further comprising the step of introducing an adhesive between the strain relief fiber elements and the splicing sleeve, and that said exposed strain relief fiber elements are connected to each other by means of said adhesive.

9. The method of claim 1, wherein the optical fiber element of at least one of said optical cables is cut to a length shorter than the length of the exposed strain relief fiber element of said one optical cable.

10. The method of claim 9, further comprising the step of sliding said splicing sleeve over the jacket of said other optical cable thereby arranging the strain relief fiber element of said one optical cable essentially on the circumferential surface of said other optical cable and that said splicing sleeve is slid in opposite direction and arranged in such a way that said splicing sleeve overlaps the jacket of each of said optical cables adjacent to the exposed optical fiber elements of said optical cables.

11. The method of claim 10, wherein in the step of sliding said splicing sleeve over the jacket of said other optical cable, the exposed strain relief fiber element of said other optical cable is bent and arranged between the splicing sleeve and the circumferential surface of said other optical cable and that sliding said splicing sleeve over the jacket of said other optical cable is stopped after said splicing sleeve has passed the free end of said exposed strain relief fiber element of said other optical cable.

12. The method of claim 9, wherein after arranging said splicing sleeve in such a way that said splicing sleeve overlaps the jacket of each of said optical cables, an excess length of said strain relief fiber element of said one optical cable projecting said splicing sleeve is cut.

13. A splice of two optical cables each having at least one optical fiber element and at least one strain relief fiber element comprising:
a splicing sleeve surrounding the optical fiber elements of the two optical cables; and
at least one strain relief fiber element of each optical cable, said optical fiber elements and at least one of said strain relief fiber elements being exposed by removal of a jacket of each of said optical cables and covered by said sleeve, the strain relief fiber elements being connected to each other, wherein the strain relief fiber element of one of said two optical cables is fixed between an outer circumferential surface of said jacket of the other of said two optical cables and an inner circumferential surface of said splicing sleeve.

14. The splice of two optical cables as defined in claim 13, wherein the end of at least one strain relief fiber element of one optical cable has a length exceeding the length of the optical fiber element of said one optical cable and wherein the end of the strain relief fiber element of said other optical cable is arranged within the splicing sleeve.

15. The splice of two optical cables as defined in claim 13, wherein said strain relief fiber elements and a circumferential surface of the optical cable are connected to each other within said splicing sleeve and by an adhesive arranged within a tube of said splicing sleeve.

16. The splice of two optical cables as defined in claim 13, further comprising a bridging element, which is connected to said strain relief fiber elements and/or to said exposed optical fiber elements.

17. A method for splicing an optical fiber element of an optical cable reinforced with at least one strain relief fiber element comprising the steps of:

removing a jacket thereby exposing the optical fiber elements and the at least one strain relief fiber element of each of the two optical cables to be spliced;

joining the optical fiber elements of the two optical cables to be spliced;

providing a splicing sleeve in such a way that it surrounds the joint of the two optical fiber elements;

attaching said splicing sleeve against the circumferential surface of said optical cables thereby connecting the exposed strain relief fiber elements of the two optical cables to each other;

arranging, after the step of attaching said splicing sleeve, said splicing sleeve in such a way that said splicing sleeve overlaps the jacket of each of said optical cables; and cutting an excess length of said strain relief fiber element of said one optical cable projecting said splicing sleeve after the step of arranging said splicing sleeve.

18. A method for splicing an optical fiber element of an optical cable reinforced with at least one strain relief fiber element, comprising the steps of:

removing a jacket thereby exposing the optical fiber elements and the at least one strain relief fiber element of each of the two optical cables to be spliced;

cutting at least one of the optical fiber elements of at least one of the optical cables to a length less than that of the exposed strain relief fiber element of the at least one optical cable;

joining the optical fiber elements of the two optical cables to be spliced;

providing a splicing sleeve in such a way that it surrounds the joint of the two optical fiber elements;

sliding the splicing sleeve in a first direction over the jacket of one of the two optical cables to arrange the strain relief fiber element of the one optical cable on a circumferential surface of the other of the two optical cables;

sliding the splicing sleeve in a second direction opposite the first direction such that the splicing sleeve overlaps the jacket of each of the two optical cables adjacent the exposed optical fiber elements of the two optical cables; and attaching said splicing sleeve against the circumferential surface of said optical cables thereby connecting the exposed strain relief fiber elements of the two optical cables to each other.

* * * * *